A. N. BYERS.
HARVESTER.
APPLICATION FILED AUG. 23, 1913. RENEWED SEPT. 11, 1917.
1,255,982.
Patented Feb. 12, 1918.
4 SHEETS—SHEET 3.
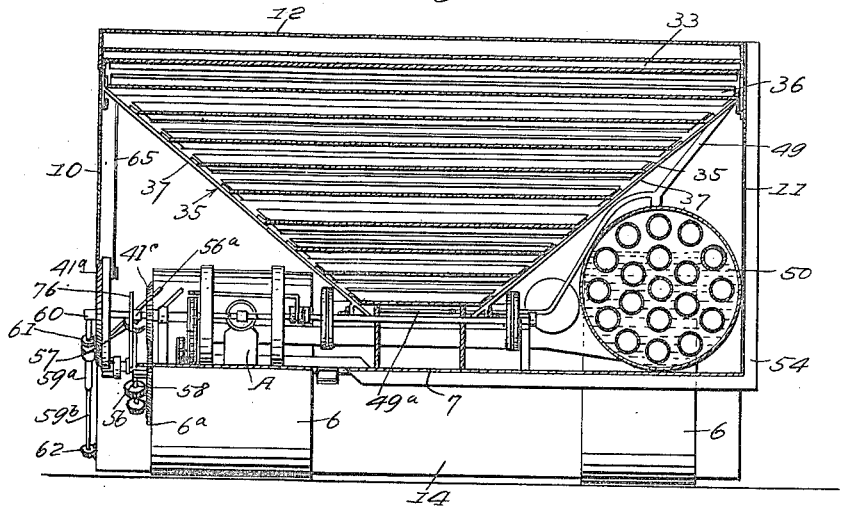
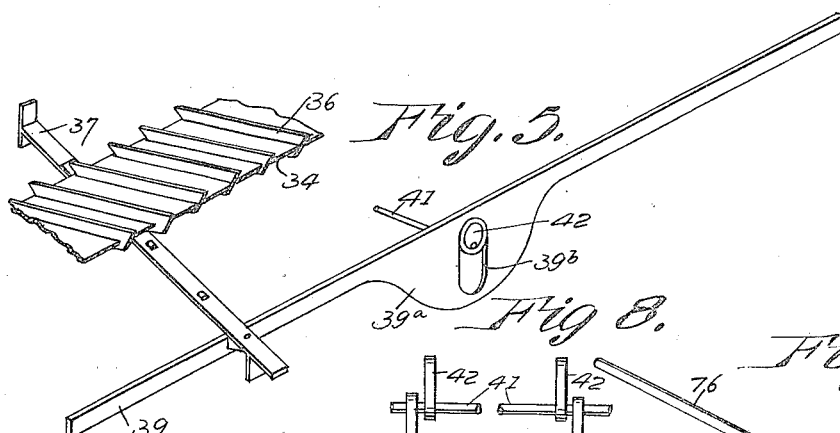
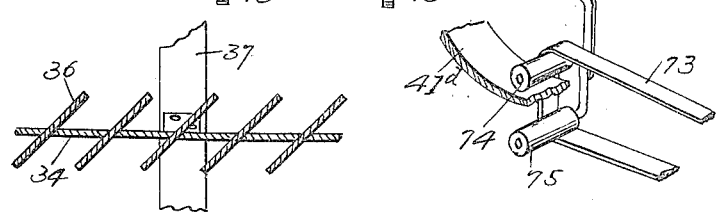

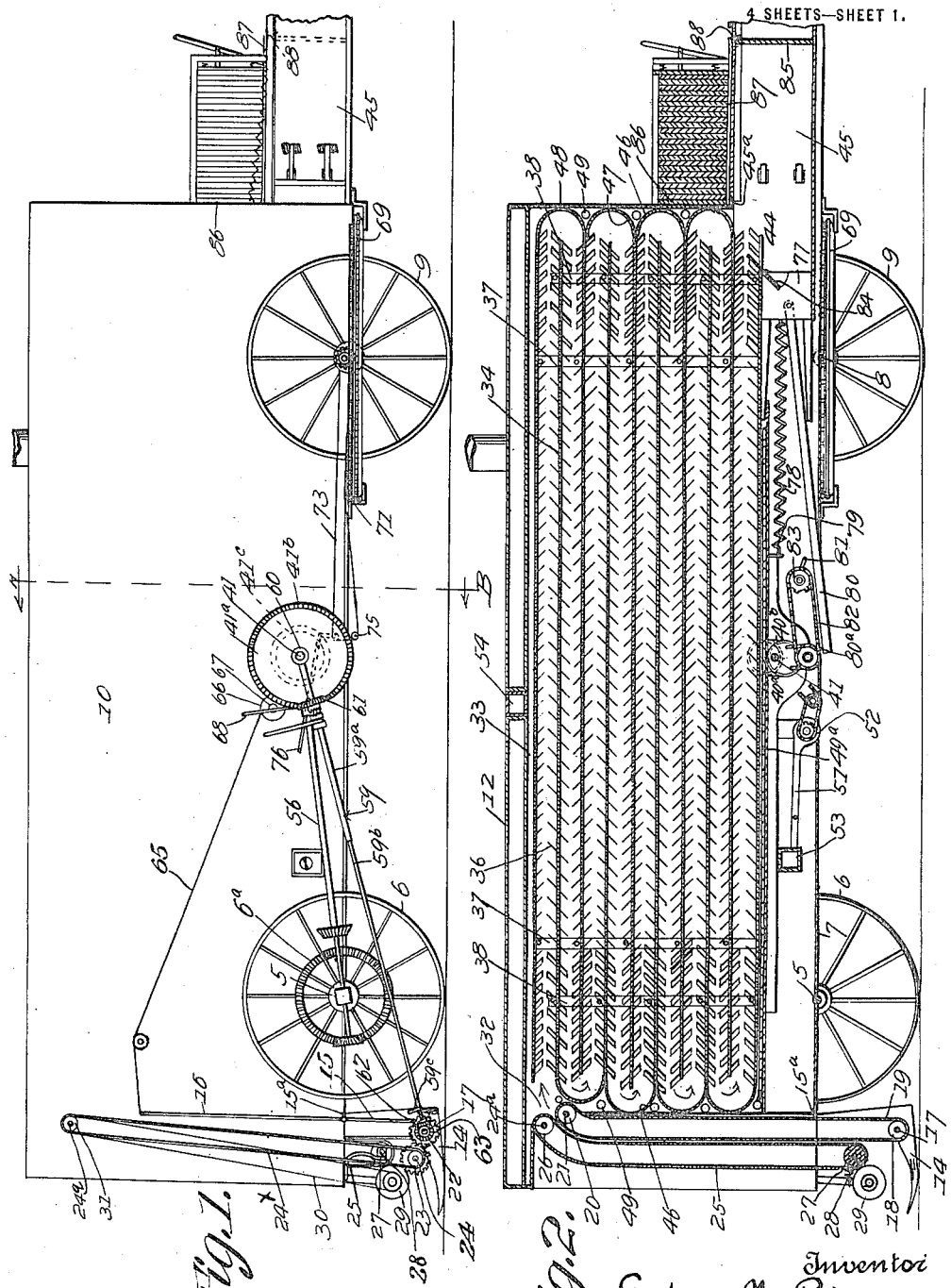

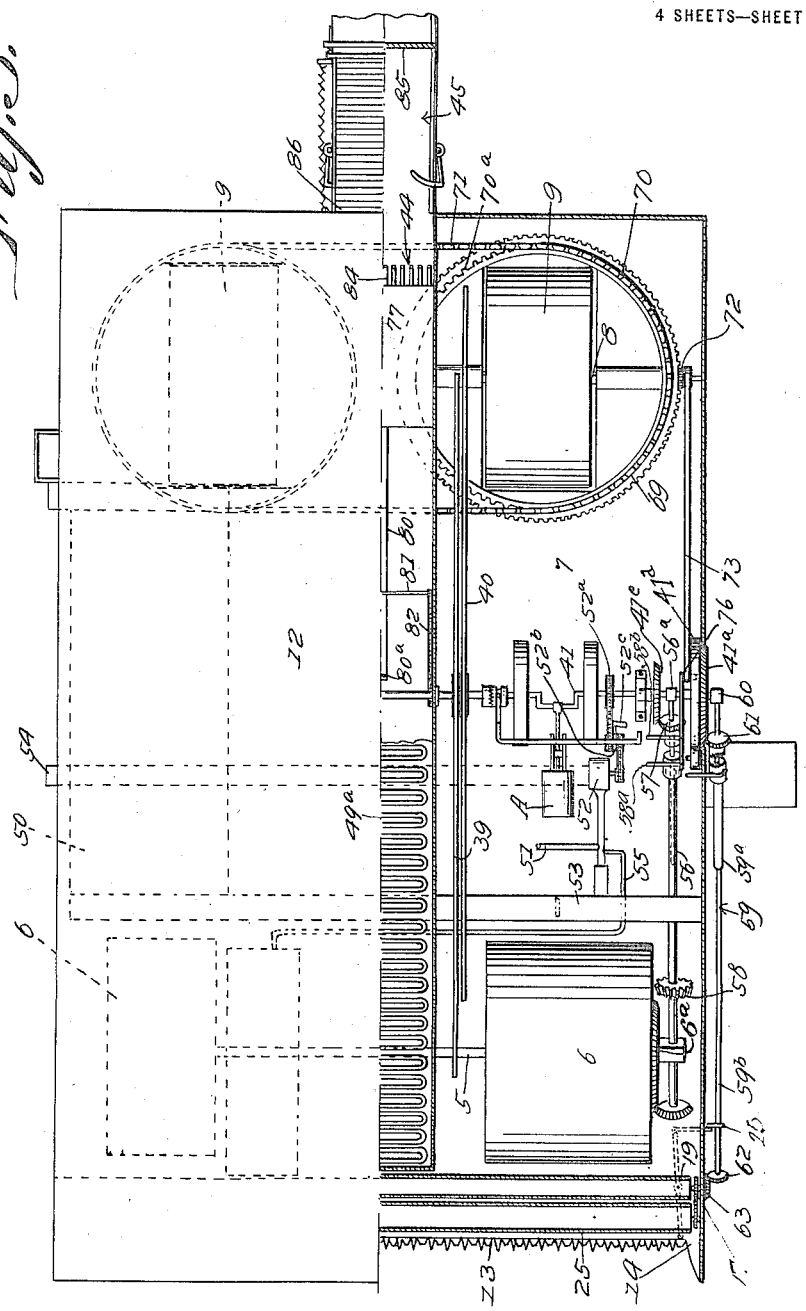

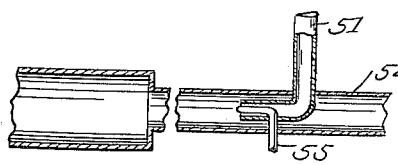
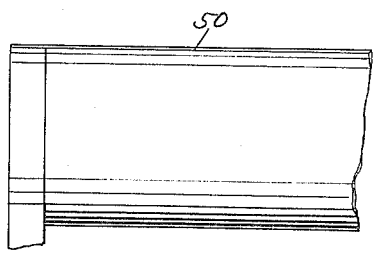
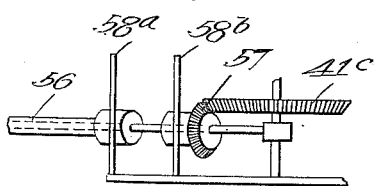
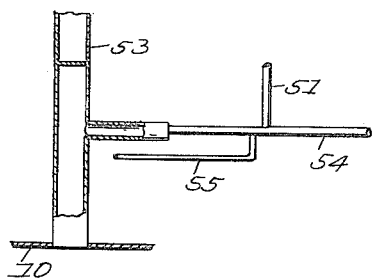
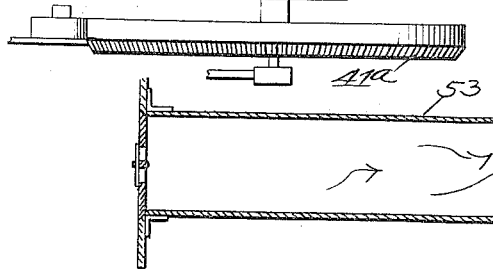
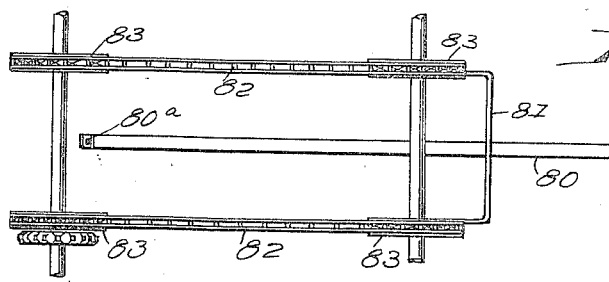
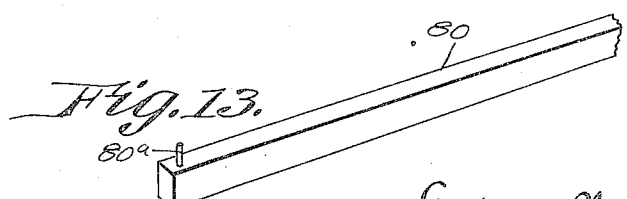

UNITED STATES PATENT OFFICE.

ANDREW N. BYERS, OF GOTEBO, OKLAHOMA.

HARVESTER.

1,255,982.  Specification of Letters Patent.  Patented Feb. 12, 1918.

Application filed August 23, 1913, Serial No. 786,300. Renewed September 11, 1917. Serial No. 190,796.

*To all whom it may concern:*

Be it known that I, ANDREW N. BYERS, a citizen of the United States, residing at Gotebo, in the county of Kiowa and State of Oklahoma, have invented new and useful Improvements in Harvesters, of which the following is a specification.

This invention relates to improvements in machines for handling hays and like forage crops and it embraces the construction of a machine which is provided with means for harvesting the hay or other crop, means for curing the hay during the period of harvesting and means for baling the cured hay during the period of harvesting and curing, so that a continuous harvesting, curing and baling process can be carried out.

The leading object of the invention is to provide a machine which will efficiently and economically harvest, cure and bale hay or other like forage crops.

Another object of the invention is the provision of a machine with means for elevating the harvested hay or other like crop which is capable of compressing the harvested hay or like crop while elevating the same.

Another object of the invention is the provision of a machine with means for moving the harvested hay or other crop by a series of vibratory steps through a curing chamber, so that the crop will be effectively cured.

A still further object of the invention is the provision of a machine with means for heating the hay immediately after its removal from the ground and means for maintaining the hay in motion over a path in the heating chamber running in alternating directions.

A still further object of the invention is the provision of a machine with means for heating harvested hay in a closed chamber and means for moving the hay back and forth in the heating chamber by a series of vibratory impulses.

A still further object of the invention is the provision of a hay curing machine with a series of horizontal hay propelling plates having projections thereon, and means for reciprocating the plates simultaneously in alternating directions and baling means adapted to receive the hay at the delivery end of the chamber.

A still further object of the invention is the provision of a machine with hay curing means having a delivery opening, and hay baling means adapted to close the opening during the operation of baling the cured hay.

A still further object of the invention is the provision of a machine for harvesting, curing and baling hay having special controlling devices and improved means for steering the rear wheels.

With the above and other objects in view the invention embraces certain new and useful combinations, constructions, and arrangements of parts, clearly described in the following specification and clearly illustrated in the accompanying drawings, in which:—

Figure 1 is a side elevation showing the general arrangement of the machine, the construction of the harvesting and elevating means, the position of the curing chamber and the relation of the baling device thereto.

Fig. 2 is a similar view showing the interior construction, the side wall being removed for this purpose.

Fig. 3 is a plan view of the machine, partly in section.

Fig. 4 is a rear end view.

Fig. 5 is a perspective view showing one of the vibrating levers and the connection of one of the vibrating hay propelling plates therewith.

Fig. 6 is a detail view, in section, of one of the vibrating hay propelling plates.

Fig. 7 is a detail perspective showing the means for reversing the direction of movement of the steering gear.

Fig. 8 is a detail view showing the arrangement of vibrating eccentrics.

Fig. 9 is a detail view of a connection between several conduits.

Fig. 10 is a similar view on an enlarged scale.

Fig. 11 is a detail sectional view of a conduit.

Fig. 12 is a plan view of a chain mechanism.

Fig. 13 is a detail perspective view of a bar.

Fig. 14 is an enlarged detailed mutilated view of the traction wheel shifting mechanism.

Referring to the accompanying drawings illustrating the preferred embodiment of the invention 5 denotes the front axle, on which the traction wheels 6 are mounted. A bed or floor 7 is positioned on and supported at one end by the axle 5 and the wheels 6, and at its rear end is supported by the rear axle 8 and the rear ground or traction wheels 9.

Side walls 10 and 11 rise from the floor 7 and on the upper edge portions of said side walls a top or cover 12 is located. At the forward end of the machine the cutter bar 13 is arranged, said bar being supported by the frame 14, which frame 14 is supported by the levers 15, one of which levers is provided with an upstanding arm 16. The levers or arms 15 are pivotally connected to the side walls at 15ª.

A shaft 17 is journaled on the frame 14 and is provided with roller 18, over which roller the vertically disposed endless conveyer 19 is trained, the upper portion of said conveyer being trained over the roller 20 of the shaft 21, which shaft is journaled between the forward portions of the side walls.

One end of the shaft 17 is provided with a gear 22 which meshes with the gear 23 of the shaft 24, which shaft is journaled on the side walls and has belt connection 24ˣ with a pulley 31 on a shaft 24ª suitably supported in position. A second conveyer 25 is trained over the roller 26 of the shaft 24ª and works closely against the first conveyer 19, the lower portion of said second conveyer being trained over the roller 27 of the shaft 28, which is mounted to slide toward and away from the first conveyer 19, and to maintain said second conveyer normally toward the first conveyer the shaft 28 may be spring pressed toward said first conveyer. A reel 29 is supported for rotation above the cutter bars and is rotated by means of the belt or chain 30, which belt or chain 30 moves over the sprocket wheel or gear 31, on the shaft 24ª.

The shaft 24ª is located on a higher plane than the shaft 20 and the upper portions of the conveyers are located adjacent the inlet 32 of the curing chamber 33.

Within the curing chamber 33, which chamber is formed by the walls, floor and top on the axles, the hay or crop vibrating and propelling means are arranged. These means consist of a series of horizontally disposed plates 34, the side edge portions of which are adapted to move against the inclined faces 35, which converge downwardly toward the center of the floor. Each plate is provided with a series of longitudinally spaced fins or blades 36, which are inserted in slots formed in the plates 34 and are inclined in common directions on said plates 34, and one half of said fins or blades projects below the plates and the other half projects above the plates. The fins or blades of the upper vibrating plate 34 have their upper portions inclined in converging lines away from the inlet or feed opening 32, while the fins or blades of the next lower vibrating plate 34 are inclined in opposite directions to the upper set. This alternating arrangement continues throughout the entire set of vibrating plates from the top of the curing chamber to the bottom. I have illustrated ten vibrating plates, or five sets of twin, or companion plates, but a greater or lesser number may be employed without departing from the spirit of my invention.

Five of the vibrating plates 34 are adapted to move in a common direction, simultaneously, and the other five of the plates are adapted to move simultaneously in a common direction and always in a direction opposite to the first mentioned five plates. To accomplish this action I connect the extreme upper plate 34 with vertical bars 37 and every other plate down to the plate next to the last one with said bars 37, and I connect the next to the extreme upper plate 34 and every other plate down to the extreme lowest plate 34 with the vertical bars 38.

The lower ends of the bars 37 are connected to the ends of the lever 39, which lever is located against the side wall 10 and is provided with a centrally enlarged portion 39ª, which is formed with a vertical or transverse slot 39ᵇ, the end portions of which slot are slightly rounded or concaved. The bars 38 are connected to the ends of the lever 40, which is provided with the centrally enlarged or offset portion 40ª, which portion has a transverse slot 40ᵇ, similar to the slot of the lever 39. A drive shaft 41 is journaled midway of the ends of the machine and on the end thereof adjacent the wall 10 an eccentric 42 is located which works in the slots 39ᵇ of the lever 39, and on said shaft 41 a second eccentric 43 is located which works in the slot 40ᵇ of the lever 40. The rotation of the drive shaft 41 will cause the eccentrics to reciprocate the levers 39 and 40 simultaneously in opposite directions. A similar arrangement of levers and eccentrics is made on the opposite side of the machine. As the opposing vibrating or reciprocating plates move in opposite directions the hay or other crop fed to the curing chamber will be forced over the plates, passing first in one direction and then in the reverse direction, until the lowermost plates are reached, when the material will be forced through the discharge opening 44, which is located above the rear end of the baling chamber 45. The terminals or upper and lower edges of the inclined fins or blades are disposed rather closely together and the hay or other material fed to the curing chamber is continually mixed in its movement over the various fins or blades, so that all particles of the material are exposed to the curing influence of the heat of the chamber. In order to direct the material in its movement from one set of coacting plates to the lower set guides 46 are located at the ends of the chamber, each guide having inwardly projecting portions 47 and concave portions 48. One end of each plate is adapted to abut against one of the projecting portions 47 and the opposite end thereof is adapted to enter the horizontally opposing concave portion, and to reciprocate continually in this relation. In this way the material is caused to alternately fall over one end of each plate and then over the other end.

In order to heat the chamber I provide suitable heating means which includes a steam or heating coil 49, arranged around the outer sides of the end guides 46 and a flat coil 49$^a$, which forms a continuation of the coil 49, which is arranged under the lowermost plate 34. The heating coil receives its supply of live steam from the boiler 50 which is located at the rear end of the right side of the machine, and the exhaust steam is conducted to the discharge pipe 51 of the combined blower and suction fan or device 52, which is located adjacent the entrance to the furnace 53. The suction and blower device 52 receives fresh air and also the steam and hot air generated in the curing chamber through a pipe 54 which terminates at the top of the chamber. The discharge steam of the device 52 enters the furnace under considerable pressure and effectively distributes the steam, hot air and oil into the furnace, so that an economical fire is maintained. The oil is fed to the furnace by the pipe 55, connected to the discharge pipe 51. The drive shaft 41 is provided on one end with a wheel 41$^a$, which wheel is provided with a circular gear rack 41$^b$, located at the periphery of the wheel and said shaft 41 is provided with a second circular gear rack 41$^c$, located inwardly of the first rack 41$^b$. A shaft 56 is supported by the bearing 56$^a$ and on one end has a small gear 57 which is adapted to mesh with the gear rack 41$^c$ and on the other end and a short distance therefrom is provided with gears 58 either of which is adapted to mesh with the gear rack 6$^a$ on one of the front traction wheels 6 by suitably actuating the lever 58$^a$, whereby the rotation of the traction wheels may be reversed as may be required. Also by suitably actuating lever 58$^b$, the pinion 57 may be thrown into or out of gear with the wheel 41$^c$, whereby the shaft 56 may be moved so as to effect engagement between either of the pinions 58 and the gear 6$^a$ for imparting movement to the traction wheel 6, or taking it out of movement. The rotation of the wheel 41$^a$ will impart motion to the shaft 56 and to the wheels 6, thereby drawing the machine over the field. The gear 57 may be moved into and out of engagement with the gear rack 41$^c$, thereby providing easy control of the ground movements of the machine.

The main shaft 41, which is driven by an engine A, is provided with a suitable clutch for connecting and disconnecting the shaft from the engine A. Said shaft 41 is adapted to operate the cutter bar 13.

The conveyers are driven through the means of a shaft 59, which consists of a tubular section 59$^a$ and a solid section 59$^b$ which is splined in the tubular section 59$^a$. The upper end of the tubular section 59$^a$ is supported in a bearing 60 and carries a gear 61 which meshes with the gear rack 41$^b$ of the wheel 41$^a$, and the lower end of the shaft section 59$^b$ carries a gear 62 which meshes with the gear 63 of the conveyer shaft 17. In this way motion is imparted to the conveyers and reel. The lower end of the shaft section 59$^a$ is provided with eccentric 59$^c$ for operating the cutter bar.

The lever 16 is connected to a cable or operating cord 65 which extends rearwardly and is connected to the drum or winder 66 on the shaft 67. The shaft 67 is supported on a lever 68 which is pivoted to the side wall 10, so that by swinging the lever the drum or winder 66 may be brought into frictional engagement with the peripheral surface of the wheel 41$^a$, whereby motion will be imparted to the drum or winder and the lever 16 tilted on its pivot, thereby raising the cutter bar above the ground.

The blower and suction device 52 receives its power from the shaft 41 by means of a belt 52$^a$, and a friction wheel 52$^b$, controlled by means of a lever 52$^c$. Any other suitable gearing may be substituted.

The rear axle 8 is connected with two annular members 69, which serve the purpose of fifth wheels and which are journaled on ball or roller bearings. The annular members 69 are provided with flanges 70 which have teeth 70$^a$ thereon, and an endless chain 71 is movable over the teeth 70$^a$. A sprocket wheel 72 engages one of the annular members, which has recesses to receive the teeth of said sprocket wheel 72. The sprocket wheel is rotated by means of a belt or chain 73, the lower portion of which is movable over the two spaced rollers or pulleys 74 and 75, which are carried by the lever 76, which lever is pivoted on the side wall 10. The rollers or pulleys are wider than the belt or chain 73 and the roller or pulley 74 is adapted to engage the outer surface of the flange 41$^d$ of the wheel 41$^a$, and the roller or pulley 76 is adapted to engage the inner surface of the flange of said wheel. By moving the lever on its pivot either one of the rollers or pulleys may be brought into engagement with the wheel, thereby reversing the motion of the belt or chain 73. In this way the direction of the steering may be determined at will.

The baling chamber 45 extends rearwardly from the rear wall of the curing chamber and is provided with the usual adjustable side walls and the usual means for adjusting said side walls. A baling plunger 77 is movably arranged under the curing chamber to move into and out of the baling chamber 45. The plunger 77 is connected to a retractile spring 78, which has its forward end fixed at 79 to the machine frame. The spring 77 is adapted to return the baling plunger to its normal position, forwardly of the mouth of the baling chamber. A lever 80 is pivoted at one end to the plunger 77 and extends forwardly and has a roller 80ᵃ on its forward end. The lever 80 is forced rearwardly by means of the arm 81 on the endless pusher chain 82 which is movable over the sprocket wheels 83. The sprocket wheels 83 have suitable driving connections with the shaft 41, whereby the arm 81 of the chain 82 will be moved in its orbit around the sprocket wheels and engage the roller on the end of the lever 80, force the lever rearwardly against the tension of the spring and compress the material or hay in the baling chamber.

A gate or valve 84 is pivoted at the mouth of the baling chamber and is engaged by the plunger 77 when it moves rearwardly into the baling chamber and is adapted to partly close the discharge opening or passage 44. A block 85 is located between the side walls of the baling chamber and forms an abutment for the hay when the plunger is compressing the same into a bale. When the bale has been formed the springs holding the block in place are released and the bale is moved along on the floor of the baling chamber to the bale tying means, (not shown). As the chain 82 is moved on sprocket wheels 83 the arm 81 will be moved out of engagement with the roller on the end of the lever 80 and the lever will be permitted to return to normal position under the action of the return spring 78. When the block and the bale are discharged or ejected from the baling chamber it is necessary to supply another block to the baling chamber to form the next bale, and for this purpose I arrange a passage 45ᵃ in the upper wall of the baling chamber and dispose a loose block 86 directly over said passage 45ᵃ so that it will drop through the passage into the baling chamber when desired. In order to prevent the block from dropping before the desired time I provide a latch rod 87 which is slidable on the upper wall of the baling chamber and under the block 86, and which thus serves to hold said block. The rear end of the latch rod 87 is connected to the rod 88 arranged in the baling chamber. When the rod or member 88 is moved rearwardly the latch rod 87 will be released and the block 86 will be permitted to drop into the baling chamber.

It will be seen that I have provided a highly efficient machine for continuously harvesting, curing and baling hay or other forage crops. The cutter bars are operated by the driving mechanism to sever the crops from the ground, the reel serves to throw the crops against the cutter bars, and to throw the cut material against the inner conveyer, and the confronting upwardly moving runs of the conveyers serve to grip the material and elevate it into the curing chamber where it is discharged into the reciprocating plates, and thence carried by a series of impulses through the curing chamber in opposing directions and finally discharged into the baling chamber, where the cured material or hay is baled and discharged. Each part of the machine coöperates with the other parts. The conveyers not only serve to elevate the material from the cutter bars and reel, but serve to compress the material so that it will readily enter the curing chamber and be easily acted on by the fins or blades of the plates 34. It is to be noted that the width of the plates 34 decreases downwardly, as the hay or material will become less bulky as it passes downwardly over the plates. Consequently both the elevating conveyers and the propelling plates in the curing chamber coöperate with the baling means to compress the hay or material into the smallest possible volume. In fact the improved machine is a continuously acting compressing crop curer.

The machine may be driven by horse power, or by electricity, or by a steam or gasolene driven engine or motor.

Various changes in the location of parts, the construction of details and their arrangement may be made without departing from the spirit of the invention.

Having described my invention I claim:—

1. A machine including a crop-curing means and a baler for continuously taking the crop from the curing means, a crop cutting means, elevating means arranged to compress the crop being elevated, said curing means and compressing means being arranged to progressively receive the crop after it is cut.

2. A machine including crop cutting means, elevating means arranged to receive the cut crop and compress the same while being elevated, and means for curing the elevated crop coöperating with the other means, said compressing means and curing means being arranged to continuously receive the crop after it is cut.

3. A machine including crop cutting means, elevating means arranged to receive the cut crop for elevating and compressing the crop, and means for curing the crop arranged to receive the elevated compressed crop, and adapted to compress the same into a smaller bulk, said curing means and compressing means being arranged to progressively receive the crop after it is cut.

4. A machine for harvesting, curing and baling consisting of continuously operating mechanism adapted to cut the crop, elevate the crop, propel the crop during the curing operation and bale the crop after the curing operation, the mechanism operating to progressively compress the crop after it is cut.

5. In combination, a wheeled machine having cutter bars at its forward end, opposing vertical endless conveyers to receive material from the cutter bars, a reel for forcing the crop against the cutter bars and moving the cut material toward the conveyers, and curing means adapted to receive the elevated crop.

6. In combination, a wheeled machine having cutter bars on the forward end thereof, opposing vertical endless conveyers supported to receive material from the cutter bars, means for simultaneously operating the cutter bars and the conveyers, means for imparting motion to the cut crop, one of said conveyers being adapted to compress the material against the other conveyer and a curing chamber adapted to receive material from the conveyers.

7. In combination, crop cutting means, crop elevating means, a curing chamber, means for heating the curing chamber, a series of plates in the curing chamber provided with crop propelling means, and means to reciprocate the plates to move the crop into the curing chamber.

8. In combination, harvesting means, a curing chamber, adapted to receive the crop harvested directly from the harvesting means, a heater for the curing chamber, and means for propelling the crop in opposing directions through the curing chamber adapted to compress the crop during its movement through the chamber.

9. In combination, harvesting means, a curing chamber adapted to receive material from the harvesting means, a series of crop propelling plates in the curing chamber, means for reciprocating the plates alternately in opposite directions to cause the crop to move downwardly through the curing chamber, and means for baling the crop delivered from the curing chamber.

10. In combination, crop compressing harvesting means, a crop curing chamber, a series of horizontal plates in the chamber, inclined blades on the plates, means for heating the chamber, and means for reciprocating the plates alternately in opposing directions.

11. In combination, crop compressing harvesting means, a crop curing chamber, a series of plates in the chamber, each plate having a series of longitudinally spaced transverse blades disposed on the same and extending at an inclination thereto on opposite sides of the plates, and means for reciprocating the plates to propel the crop in alternately opposite directions through the curing chamber.

12. In combination, crop compressing harvesting means, a curing chamber, a series of horizontal plates in the curing chamber, inclined blades extending through the plates and inclined in common directions, the blades of the opposing plates being inclined in opposite directions, and means for reciprocating the opposing plates in opposite directions.

13. In combination, crop compressing harvesting means, a curing chamber, means for heating the curing chamber, a series of horizontal plates in the curing chamber, a series of blades extending through each plate and inclined in a common direction, the blades of the opposing plates being inclined in opposite directions and the confronting edge portions of the plates being disposed in relatively close relation, and means to reciprocate the opposing plates in opposite directions.

14. In combination, crop compressing harvesting means, a curing chamber, a series of horizontal plates in the curing chamber in superimposed relation, the plates decreasing in width from the uppermost plate to the lowermost plate, projections on the plates, the projections on the opposing plates facing in opposite directions, and means for moving the opposing plates in opposite directions.

15. In combination, crop compressing harvesting means, a curing chamber, a series of crop propelling plates in the curing chamber arranged in superimposed relation, each of the plates having projections, the projections of the confronting plates facing in opposite directions and the projections of the individual plates facing in common directions, bars connecting the alternate plates, levers connected to the bars, and eccentrics for reciprocating the levers to reciprocate the alternate plates in opposite directions.

16. In combination, crop harvesting means, crop curing means, a baling chamber adapted to receive the material cured, a plunger movable in the baling chamber, a lever connected to the plunger, a return spring connected to the plunger, an endless chain having an arm to engage the end of the lever and move the lever and plunger, a block in the baling chamber forming a removable end wall therefor, and means for dropping a second block into the chamber when the first block is released.

17. A combined crop harvester having a cutter, means for compressing the crop as it is received from the cutter, means for baling the crop, a curer to receive the crop from the compressing means said crop baling means being arranged to receive the cured crop from said curer, and continuously operating mechanism effecting coöperation between the aforesaid parts.

18. A combined crop harvester having a cutter, means for subjecting the crop to a continuous compressing action as it is received from the cutter, means for elevating the crop, a curer having a continuous compressing action and arranged to receive compressed crop from the harvester and continuously operating mechanism effecting coöperation between the aforesaid parts.

19. A combined crop harvester having a cutter, means for imparting a continuous compressing action to the crop as it is received from the cutter, means for elevating the compressed crop, a curer receiving the initially compressed crop and means operating to continuously compress the crop, and continuously operating mechanism effecting the coöperation of the aforesaid parts.

In testimony whereof I have hereunto set my hand in presence of two subscribing witnesses.

ANDREW N. BYERS.

Witnesses:
R. PEALE HERRICK,
L. SOUTHWORTH.